United States Patent [19]

Healy et al.

[11] Patent Number: 5,668,961

[45] Date of Patent: Sep. 16, 1997

[54] SYSTEM AND METHOD FOR FAST DISPLAY OF DATA OBJECTS IN A TABLE

[75] Inventors: Vivian Louise Healy, San Jose; Hanhsi Huang, Cupertino; Tin Luong Nguyen, San Jose, all of Calif.

[73] Assignee: International Business Machines Corporation, Armonk, N.Y.

[21] Appl. No.: 450,283

[22] Filed: May 25, 1995

[51] Int. Cl.$^6$ .................................................. G06F 3/00
[52] U.S. Cl. ............................................. 345/339; 395/770
[58] Field of Search ................................. 395/155, 157, 395/159, 161, 339

[56] References Cited

U.S. PATENT DOCUMENTS

| | | | |
|---|---|---|---|
| 4,899,377 | 2/1990 | Bauer et al. | 379/354 |
| 5,297,253 | 3/1994 | Meisel | 395/160 |
| 5,312,478 | 5/1994 | Reed et al. | 395/148 |
| 5,317,686 | 5/1994 | Salas et al. | 395/157 |
| 5,375,201 | 12/1994 | Davoust | 395/161 |
| 5,414,809 | 5/1995 | Hogan et al. | 395/155 |
| 5,546,526 | 8/1996 | Li et al. | 395/159 |
| 5,553,218 | 9/1996 | Li et al. | 395/148 |

*Primary Examiner*—Raymond J. Bayerl
*Assistant Examiner*—A. Katbab
*Attorney, Agent, or Firm*—Baker, Maxham, Jester & Meador

[57] ABSTRACT

A system and method for displaying on a computer screen a specified data object that is part of a data table, in response to a user selecting a displayed object metaphor. The indexed location of the data object relative to other similar data objects in the table is computed and the maximum pixel positions needed to display characters on the screen is also determined. The system also produces the total number of similar data objects in the table and computes a signal that is proportional to the combination of the indexed location and the maximum character pixel positions. From the first signal, a second signal is created that is proportional to the value of the combination further combined with the total number of similar data objects in the table. Generally, the second signal is translated into a value representing the character pixel location of the specified data object and this value is used to position the object display.

19 Claims, 10 Drawing Sheets

SYSTEM AND METHOD FOR FAST DISPLAY OF DATA OBJECTS IN A TABLE

BACKGROUND OF THE INVENTION

1. Field of the Invention

This invention relates generally to computer system/user interfaces and, more particularly, to a computer system/user interface having the ability to quickly locate and display data that a user has indicated he would like to see displayed on a computer screen.

2. Description of the Related Art

A graphical user interface (GUI) is a type of computer system/user interface that provides structured data objects displayed as icons or object metaphors that can be controlled by users to manipulate the underlying data objects and initiate system actions. The object metaphors are displayed on a workstation display device and are manipulated with a user input device, such as a keyboard, track ball, or mouse. A GUI provides a more efficient, user-friendly interface with which a user can operate a computer system workstation. A GUI also permits many applications to share the workstation display screen and thereby permits the user to easily move and share data between multiple applications or data structures.

The movement and sharing of data between applications and data structures is possible because the GUI provides a blank area display called a desktop, in which are displayed one or more working areas called "windows". Data entered by the user, as well as icons or object metaphors, can be displayed in the windows and can be manipulated by the user. In general, each window has several icons with which a user can interact to manipulate and change the display and to initiate system actions.

A common type of GUI provides a window display representing readily identifiable office object metaphors operated on by the system after the user has designated the metaphor by moving the display cursor over the metaphor with a display mouse device and then pressing or "clicking" a display mouse device button. For example, in a GUI a file folder metaphor (a 2-dimensional representation of a file folder) can represent a data object containing one or more documents. A user can open the file folder metaphor and display its contents, which can be documented data objects represented by document icons, by moving the display cursor over the file folder metaphor and clicking the mouse button while the cursor is positioned over the metaphor. The computer system responds to the button clicking on the file folder by changing the file folder metaphor, such as replacing the working area of the window with a display of the first page of the subject document.

A GUI is fundamentally a protocol by which an application can generate output on a computer that has a bit-mapped display and can receive input from devices associated with the display. Through an application programming interface (API) different applications can interact with the interface and the underlying operating system. One popular operating system is the UNIX operating system which was originally developed by Bell Labs. Many versions of the UNIX operating system are provided by various computer companies. For example, the IBM Corporation provides an operating system known as AIX which is readily familiar to those with a background in UNIX programming. One GUI that is available to work with AIX is OSF/Motif which is based on the X-window system, often abbreviated as X. OSF/Motif is available from the Open Software Foundation, Inc. (OSF). The X-window system was developed by the Massachusetts Institute of Technology.

OSF/Motif is the means by which an application program can obtain input from and display output to a user of the application. Motif provides the intermediary mechanisms for communication between the application and the user. To both sides, these mechanisms appear as a set of objects with graphical representations on the screens. The program creates and displays objects of a variety of types provided by Motif for showing the user particular kinds of output and requesting particular kinds of input. The user supplies input by manipulating the screen representations as objects with a pointer, a keyboard, or both as described above. The Motif API is supplied by OSF and is implemented in the "C" programming language. Motif requires that an application written in C conform to the American National Standards Institute (ANSI). For this reason, it is convenient to explain the logic implemented by this invention in terms of the C language conforming to ANSI standards; however, it will be apparent to those skilled in the art that other programming languages as well as well-known hardware logic can be substituted in view of the teachings described below. For a comprehensive overview and description of how to program to communicate with the OSF/Motif API, reference may be made to the *OSF/Motif Programmer's Guide*, Release 1.2, provided by the Open Software Foundation, Inc.

The X-window system upon which Motif is based is architectured along the client-server computing model. The application program is the client, communicating through the X protocol with a server that handles the direct output to an input from the display. The client and server may be running on the same machine or on different machines, communicating over a network. Applications do not communicate with the X server directly. Instead they use one or more libraries that provide high-level interfaces to the X protocol. The three principal libraries available to a Motif application are X lib, the X tool kit intrinsics (Xt), and Motif tool kit. Three of the most important Xt contributions are the following: objects, known as widgets, used to hold data and present an interface to the user; management of widget geometry; and dispatching and handling of events.

A widget is a combination of state and procedure. Each instance of a widget is a member of a class. A widget class holds a set of procedures and data structures that are common to all widgets of that class. A widget instance contains the procedures and data structures that are particular to that single widget. A widget instance also has a pointer to its class. Each widget class typically provides a general behavior associated with a particular kind of interaction with the user. For example, Motif has a widget class designed to let the user enter and edit text. This class provides a general behavior to support test input and display, including editing, selection, cutting and pasting of text. The class has data structures related not only to the context of the text but also to the appearance of the widgets when displayed as object metaphors. To use this class, an application creates an instance of this class of widget and provides some of its own data and procedures for the widget instance.

Xt and Motif are intended to provide all the widget classes that most applications need. The user, the application, and the widget class are combined to provide values for resources and thus to control the appearance and other attributes of components of the application. The user and the application can also supply different resource specifications, depending on the locale, the characteristics of the screen, or arbitrary customization criteria. When the application starts up, Xt combines these specifications into an initial resource database. When the application creates a widget, Xt assigns initial values to the widgets resources using the specification from the database, from values supplied by the application at creation time, or from defaults supplied by the widget class. After creating a widget, the application can use the Motif provided "XtGetValues" routine to retrieve the value of a widget resource and the Motif provided "XtSetValues" routine to supply a new value for a resource.

Although the AIX operating system and the OSF/Motif GUI are quite powerful, there are many frustrations to users of AIX and other UNIX-type operating systems because tools provided for quickly locating and displaying desired data located in a data base are still rather primitive. For example, FIG. 1 shows a prior art window or panel 17 in which a table 11 of file system data is displayed. If the user desires to see information that is in a column that is not currently displayed in the panel 17 then his only choice for viewing this data is by clicking on scroll bar arrow 13R or 13L to move scroll slider 19 within scroll bar 15 to cause the columns in the table to shift to the left or the right. Thus, for example, if the user wants to see the contents of the fifth column identified with a partial label "Resid" then he must click on 13R (R is used to indicate right) to cause the data object 19 representing a scroll slider to move to the right. This will cause column 5 to come further into view in panel 17. Further, a disadvantage of such a system for displaying columns in a table is that there is no way for the user to know what each column contains without moving the slider across its full spectrum within the scrolling bar 15. It is possible that the user may miss some information because columns are not displayed within a window.

It would clearly be an advancement in the art to provide a graphical user interface with such a system as a UNIX operating system to provide a quick way for knowing by iconic or object representation which columns are located in a table and further providing a quick way to locate and display such columns. Further, it would be desirable to provide such a system that is compatible with tools provided with the operating system, such as widgets in the case of a UNIX-type operating system.

SUMMARY OF THE INVENTION

It is an object of this invention to provide a graphical user interface (GUI) with iconic or object metaphors for all columns located in a database table.

It is a further object of this invention to provide such object metaphors which a user can select to locate a column in the table.

It is yet another object of this invention to provide such object metaphors which can be used to quickly make the identified columns appear quickly in a window on a user's computer data display.

It is still a further object of this invention to provide the above-described advantages while still retaining a scrolling bar function to allow the user to move with his own desired resolution.

In accordance with achieving these objectives and overcoming the limitations of the prior art as discussed above, this invention provides GUI logic that includes several modules for creating data objects which may be manipulated by a user to determine a position of a column within a table. In response to the user action a signal is created based on this position. The scroll bar is positioned in response to the signal to quickly and conveniently display a column that a user, by manipulating the objects, has indicated that he wishes to have displayed instantaneously. To provide these capabilities for the user, a user panel creation module is used to create the data objects on the screen and the logic further includes a user panel selection response module for responding to a user's manipulation of these objects.

BRIEF DESCRIPTION OF THE DRAWING

Other objects and advantages of the invention will become apparent upon reading the following detailed description and upon reference to the drawing in which.

DETAILED DESCRIPTION OF THE PREFERRED EMBODIMENTS

This invention is described in a preferred embodiment in the following drawing figures. In these figures, a like number shown in various figures represent the same or similar elements. While this invention is described in terms of the best mode for achieving this invention's objectives, it will be appreciated by those skilled in the art that variations may be accomplished in view of these teachings without deviating from the spirit or scope of the invention. In particular, certain aspects of this invention are described as operating in terms of computer software in computer memory but this invention could also be enabled as hardware by one skilled in the computer arts in view of these teachings.

System Architecture

Figure 2:
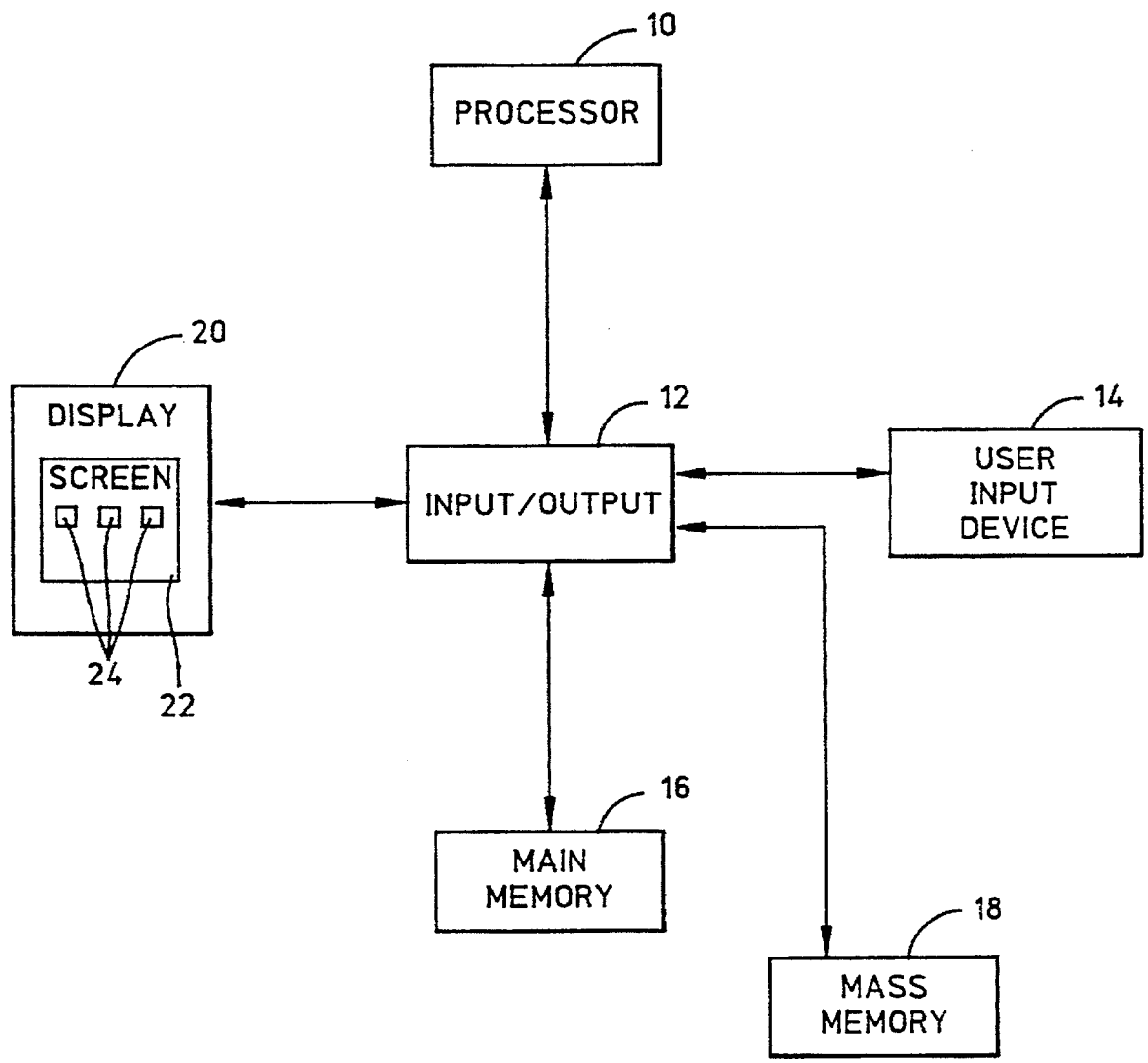
FIG. 2 is a block diagram of a data processing system employing the present invention.

FIG. 2 shows a preferred environment for the operation of this invention. Processor 10 is the central control unit of the hardware as well as the main engine for running software, including the logic of the present invention. The processor is in communication with input/output circuitry 12 to enable communications with various peripherals for enabling this invention. Main memory 16, which may be well-known random access memory or read only memory, loads software that enables this invention. The software (not shown in FIG. 2) is typically loaded from mass memory unit 18, which may be a well-known direct access storage device, such as a hard disk. Communications between main memory 16 and mass memory 18 is achieved through input/output circuitry 12.

Figure 3:
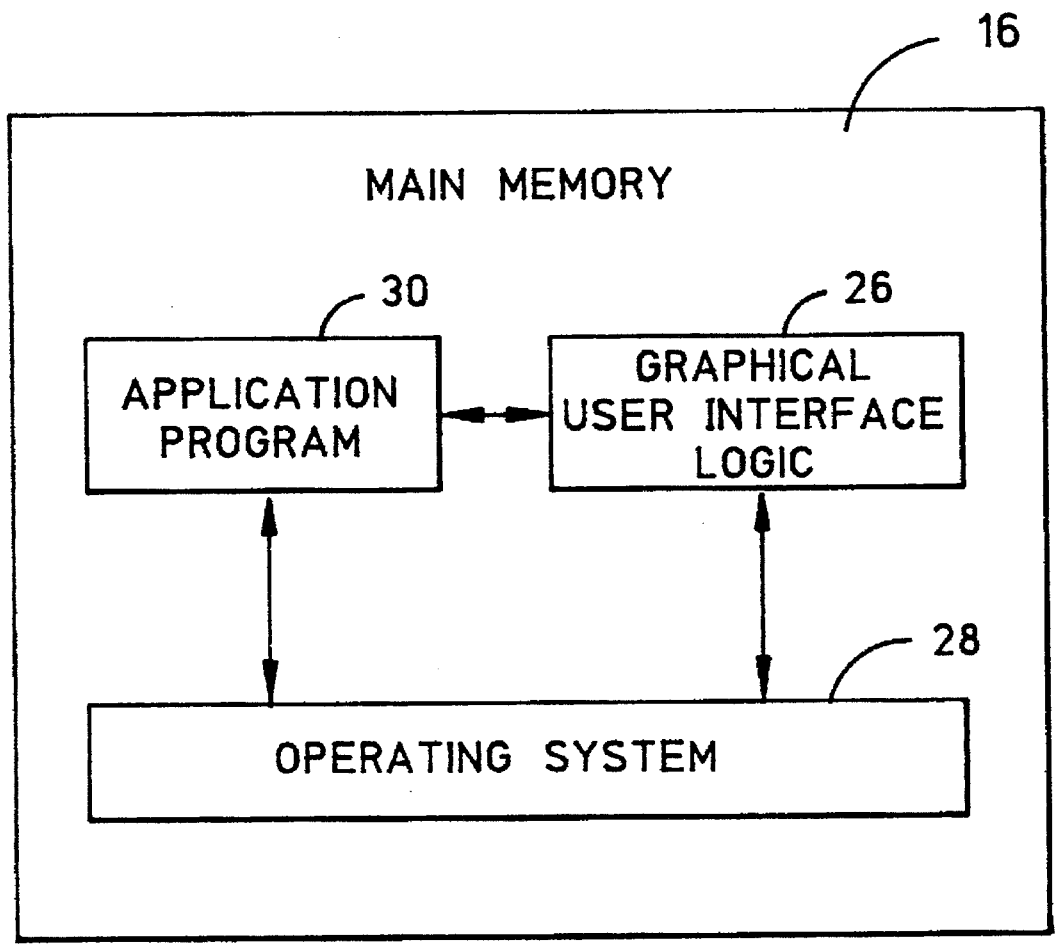
FIG. 3 is a schematic diagram showing the logic of this invention and other software components of the data processing system of FIG. 2.

In keeping with the objectives of this invention, programs or logic, shown in FIG. 3, operate with operating system 28 in the computer architectural environment shown in FIG. 2. Graphical user interface (GUI) logic 26 interfaces directly with operating system 28 in main memory 16 through input/output circuitry 12 to control output displayed on screen 22 of display 20. Access to the display is regulated by processor 10, as is well known in the art. The processor may be, for example, a reduced instruction set computer (RISC), such as an IBM RISC Processor. Operating system 28 is preferably a UNIX-type operating system such as IBM's AIX version 3.2, 3.25, or 4.1. For the sake of completeness, another type of application program 30 is shown in communication with operating system 28. Such an application program can act to display graphical objects 24 on screen 22 to a user through GUI logic 26. The user may manipulate objects 24 through a user input device 14, such as a well-known mouse or keyboard. In a preferred embodiment of this invention, the GUI logic is the means by which an application program can obtain input from and display output to a user of the application.

In a preferred embodiment the operating system includes an additional layer which contains some graphical user interface logic of its own. Such a layer is not shown in FIG. 3 but could include, for example, the well-known Motif application program interface (API). The Motif API is supplied by the Open Software Foundation, Inc. Motif, for example, provides the intermediary mechanisms for communications between the application and the user. To both sides, these mechanisms appear as a set of objects of graphical representations on the screen, such as objects 24. Objects 24 include object metaphors to represent other data objects that may or may not be represented on the screen simultaneous with the object metaphor. Application program 30 creates and displays objects of a variety of types, provided by Motif and GUI logic 26, for showing the user particular kinds of output and requesting particular kinds of input. The user supplies input by manipulating the screen representations of these objects or object metaphors on screen 22 with the user input device 14. Through such a protocol as Motif, application program 30 can generate output on display 20 through the technique of bit mapping and then receive input from devices, such as device 14, associated with the display through input/output circuitry 12. GUI logic 26 provides the user with a tool for manipulating objects 24 in accordance with the objectives of this invention. Because the API's that are popularly used with operating systems, such as AIX, require application programs be written in the "C" or "C++" language, examples for implementing the GUI logic 26 are shown in the "C" language; however, it will be appreciated by those skilled in the art that other languages known and presently unknown can be implemented in view of the flow diagrams and graphical representations shown in the drawing figures below.

Figure 4:
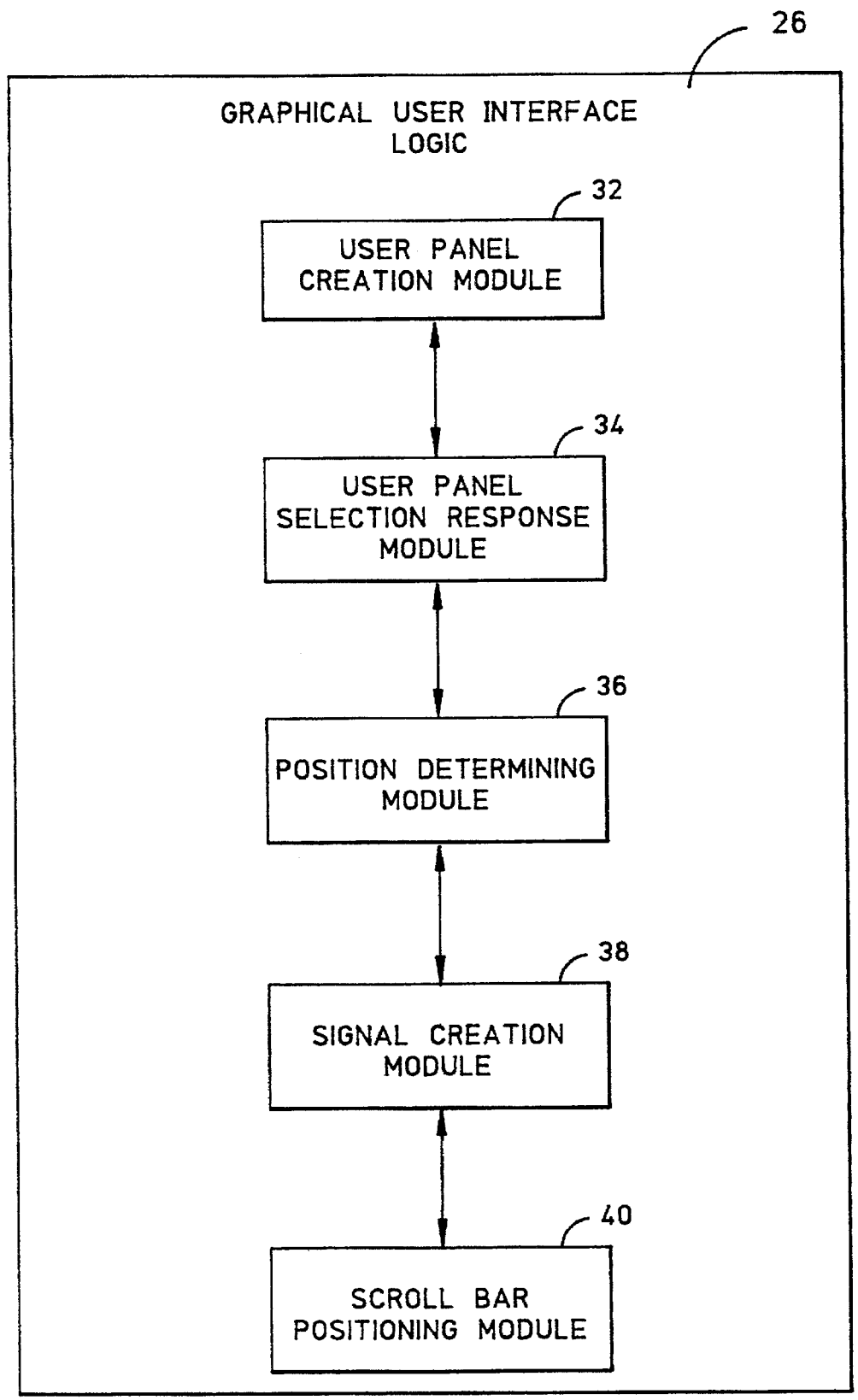
FIG. 4 is a schematic diagram of the graphical user interface logic of this invention and the various modules of which it includes.

FIG. 4 shows various modules which are implemented as part of logic 26. The operation of these modules can best be understood by reference to an example of screen 22 of FIG. 5 in which various objects are shown displayed in graphical form. User panel creation module 32 is used to create the various objects shown on screen 22 in FIG. 5. The objects shown are merely example objects of an example application program which, in this particular example, is a utility for managing space in a user's mass memory. The module 32 creates a user panel 23 shown on the screen 22. GUI logic 26, by using tools of the operating system's protocol, such as the Motif API, creates data objects including object metaphors on display screen 22. Thus, in the case of the Motif, for example, object metaphors and the data objects for creating the graphical user interface panel can be created by defining and then calling a widget class. The general techniques for creating object metaphors are known and reference can be made to the above-mentioned *OSF/Motif Programmer's Guide* for specific examples and detail on creating such widget classes. The user panel includes an action bar 46 so that the user may select from it a menu item 56, such as "File" or "Window". Such an action bar is well known in the art and referenced here for the sake of completeness.

Exemplary Embodiments

Figure 1:
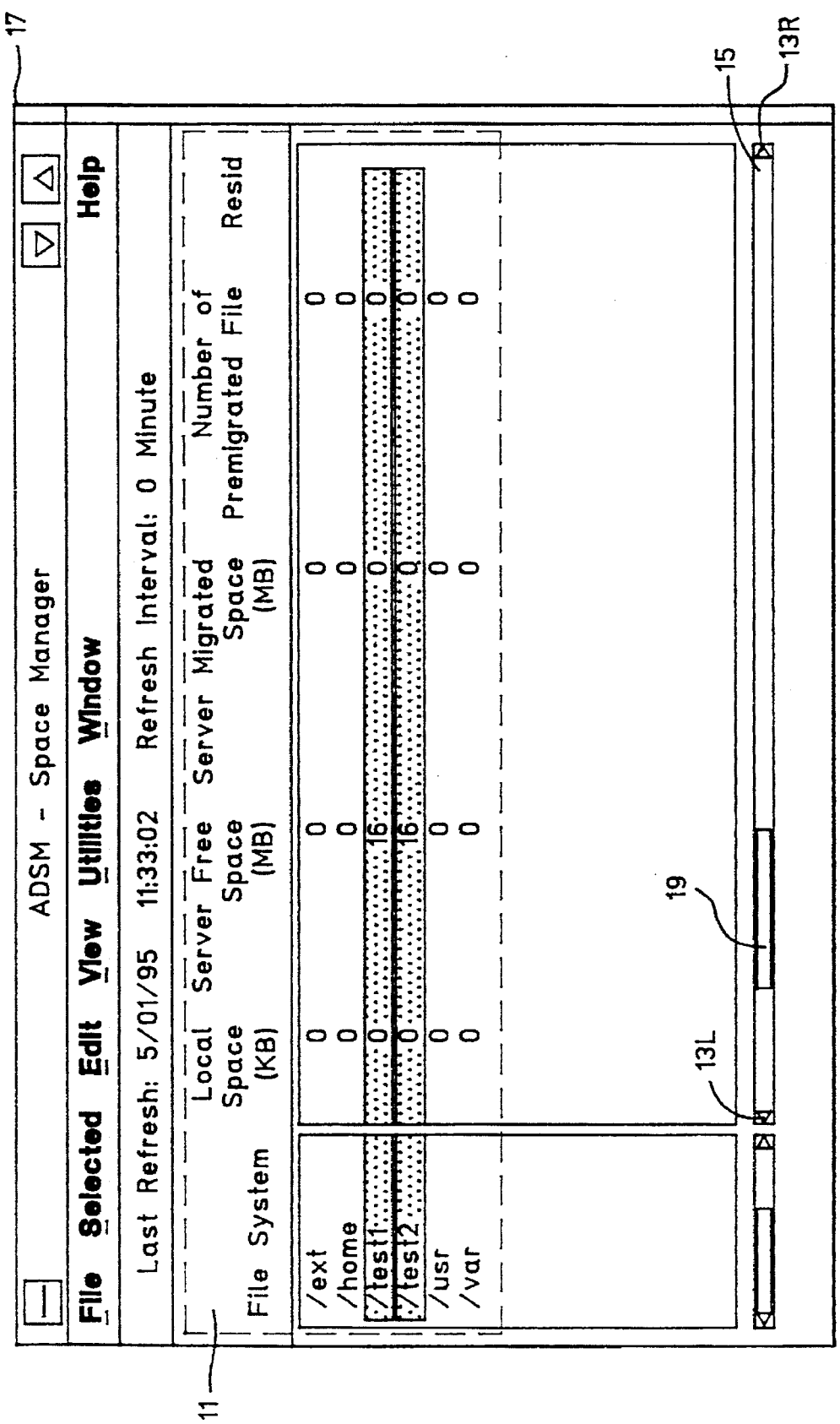
FIG. 1 is a prior art representation of a graphical user interface containing columns within a table and not having the advantages of this invention.

A table 44 on the panel 23 includes several columns, such as "Local Free Space", "Local Resident Space", and "Local Premigrated Space". A column entitled "File System" includes several rows which are used for further identifying the entries in each respective above-referenced column. In this illustrative example, the rows include "/ext", "/home", "/test1", "/test2", "/usr", and "/var". Each one of the rows identifies a particular file system in this example. Thus, for example, on file system "/ext" there are 37,152 kilobytes of local free space and 589,536 kilobytes of local resident free space and 0 bytes of local premigrated space. In a fashion similar to a prior art computer, as described above in FIG. 1, if a user wants to see any columns that are not presently displayed in a panel, such as panel 23, then he may use an input device such as a mouse to select the scroll bar 52 by "clicking" on scroll arrow 53R to scroll the screen columns right or 53L to scroll left. "Clicking" refers to the action of the user positioning a cursor (not shown) on panel 23 and then pressing a particular mouse button, as is well known in the art. This invention will be described in terms of clicking on object metaphors that represent data objects, but it is well understood that a keyboard could be used as an input device rather than a mouse. This invention provides a new way for a user to see columns not presently displayed while retaining the ability to scroll, as in the prior art. Operation of the new methods enabled by this invention will be described in detail below. If the user wishes to go to the last column displayed in table 44 which, in this particular example, is the column entitled "File System State", and is relying solely on prior art methods then that user would need to click several times on scroll arrow 53R until that column appeared on panel 23. This is inconvenient, cumbersome, and takes a considerable amount of time, particularly if there are a large number of columns in table 44. Thus, based on the inventors' critical recognition of this long-felt need in the art to select columns in a table without the cumbersome use of a scroll bar, the logic of this invention has been created to enable a new method. To eliminate the problems of the prior art, a bank 48 of buttons 50 is provided as object metaphors for data objects on screen 22a. Each data button 50 corresponds to a particular column in table 44. Thus each data button 59 is a metaphor for column data objects belonging to table 44.

Figure 5:
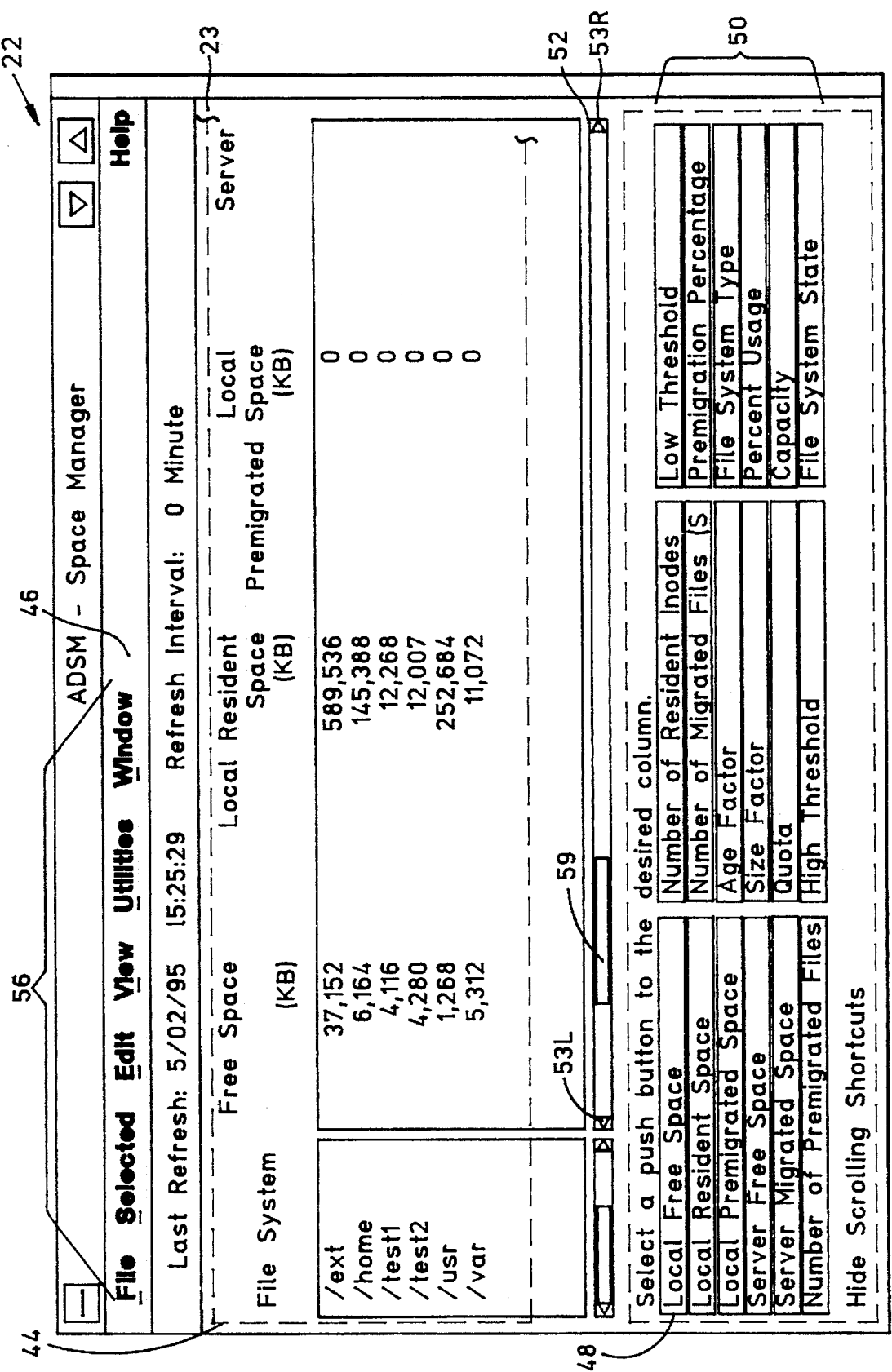
FIGS. 5 and 6 are illustrations of example display panels with data objects which can be selected by a user to locate particular columns within a table.

In the illustrated example shown in FIG. 5, there are 18 columns in table 44, thus bank 48 includes a corresponding 18 buttons. Each of these buttons are data object metaphors for corresponding column data objects. The choice of a button for each column maximizes the convenience of selecting a column, however, it will be appreciated that "18" is a solely arbitrary choice. The buttons are not numbered in this illustration because numbers are not necessary to identify each button. In FIG. 5, it can be seen that the first three buttons shown correspond to the first three columns or column data objects, "Local Free Space", "Local Resident Space", and "Local Premigrated Space", respectively. A button "File System State" corresponds to a column entitled "File System State" and the column is presently not shown on panel 23. A button entitled "Age Factor" corresponds to a column so entitled but also not presently shown on panel 23. In accordance with this invention, if a user wishes to see the column entitled "Age Factor" then he merely clicks on the "Age Factor" button using the user input device 14. Referring to FIG. 4, in order to respond to the clicking of the "Age Factor" button, the GUI logic 26 is provided with a user panel selection response module 34. In response to the selection of that button, the user panel selection response module 34 calls on position determining module 36 to determine the location of the corresponding column. The position determining module determines the location of a column dynamically in response to the user clicking. A signal corresponding to the determined location is created by module 38 that is used by scroll bar positioning module 40 to place the scroll bar 52 to the determined location of the column in correspondence to the button pushed directly (without scrolling). Thus, instead of requiring the user to scroll across numerous columns, as required in prior art configurations, a user can simply click on a pushbutton, which is an object metaphor for the column data object, such as the "Age-Factor" button, that identifies a column and the column will quickly appear in the panel 23.

Figure 6:
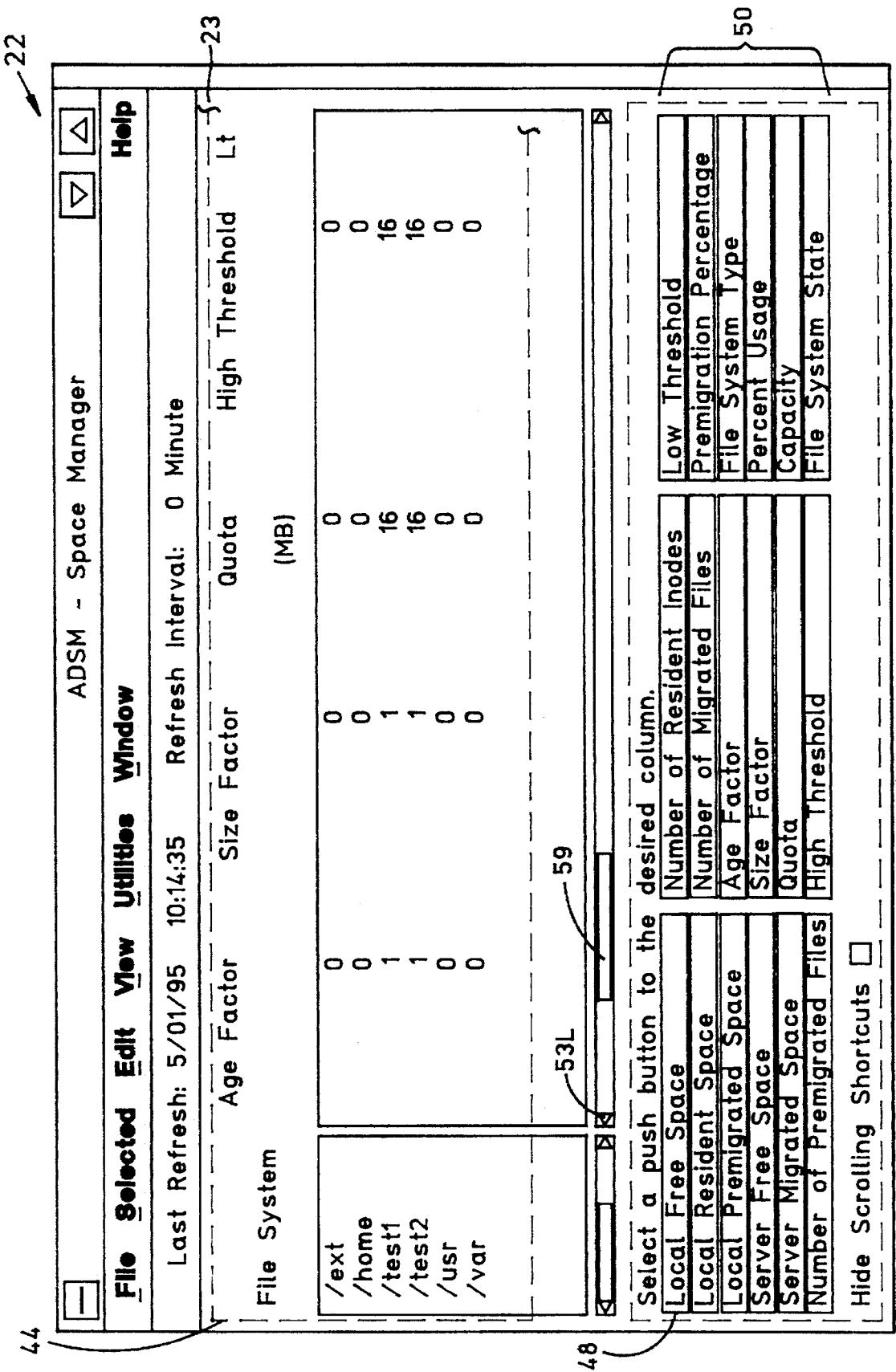

FIG. 6 is a representation of the exemplary panel 23 of FIG. 5 wherein the "Age Factor" button has been selected by a user through the graphical user interface. The bank of pushbuttons 48 still appears on panel 23 with all of the same buttons 50. However, the table 44 is now displayed with new, previously undisplayed, columns, shown here labelled as "Age Factor", "Size Factor", "Quota", and "High Threshold". Other columns belonging to table 44 are not shown on panel 23 because of inadequate space available on the screen 22, but each column has a corresponding pushbutton of the plurality of pushbuttons 50 and therefore can be readily displayed in accordance with this invention. Thus, for example, in response to a signal created by the module 38 the scroll bar is positioned to display the "Age Factor" column on the reconfigured panel 23. It will also be noted in this example that "Size Factor", "Quota", and "High Threshold" buttons in bank 48 correspond to the columns in table 44. Thus, the invention enables the simple selection of a button to display a column automatically to a user.

Preferred Embodiment Pseudocode

As described above, the location of the column is computed dynamically each time a user clicks on such a pushbutton and the system then forces the scroll bar to the computer location of the column directly. The position of scroll bar 52 is represented graphically to the user by slider 59 which appears proximately relative to either scroll arrow 53L or 53R. The position of the slider determines the position of the scroll bar. Thus, the inventors have recognized a method of allowing the logic 26 to reconfigure memory 16 to create a signal that is proportional to a newly determined value for the slider. The new slider position represented by the variable "new" can be determined by the following rule:

$$new = (begPtr \rightarrow colPos[index] * maximum) / begPtr \rightarrow maxCol,$$

where "begPtr→colPos[index]" represents a column index of the user selected column (e.g., the "Age Factor" column is indexed as the numeral 9 because that column is in the 9th column of 18 columns), and "maximum" corresponds to the maximum value for character locations that can be displayed on screen 22, and "begPtr→maxCol" corresponds to the maximum number of columns presented in the table 44 (e.g., 18 in the exemplary table). It should be noted that only a portion of the maximum value is shown on screen 22 at any one time without the need for scrolling. Thus, the scroll bar must be moved in order for the user to view all character pixel positions which screen 22 is adapted to display. The implementation of this dynamic calculation in the pseudocode representing the preferred embodiment of the GUI logic 26 is shown in Table 1 below.

TABLE 1

```
#ifdef PROTOTYPES
static void activateCB_scroll ( Widget w, XtPointer c, XtPointer cbs )
#else
static void activateCB_scroll ( w, c, cbs )
    Widget w;
    XtPointer c;
    XtPointer cbs;
#endif
{
    Arg     args[2];
    int     index, maximum;
    int     value, slider_size, increment, page_increment, new;
    Widget  bottomSB, topSB;
    TRACEPOINT (ENTER,"activateCB_scroll()\n");
    index = (int) c;
    XtSetArg ( args[0], XmNhorizontalScrollBar, &bottomSB ) ;
    XtGetValues ( begPtr—>fs_scrollwin2, args, 1 ) ;
    XtSetArg ( args[0], XmNhorizontalScrollBar, &topSB ) ;
    XtGetValues ( begPtr—>label_scrollwin, args, 1 ) ;
    XtSetArg ( args[0], XmNmaximum, &maximum ) ;
    XtGetValues (bottomSB, args, 1 ) ;
    XmScrollBarGetValues ( bottomSB, &value,
        &slider_size, &increment, &page_increment ) ;
    new = (begPtr—>colPos[index] * maximum ) / begPtr—>maxCol;
    if(new > maximum-slider_size)
    new = maximum-slider_size;
    XmScrollBarSetValues ( bottomSB, new,
        slider_size, increment, page_increment, True ) ;
    XmScrollBarSetValues ( topSB, new,
        slider_size, increment, page_increment, True ) ;
    TRACEPOINT(EXIT," leaving activateCB_scroll()\n") ;
}
```

In the above representation of logic 26 by interaction with the operating system 28 the main memory 16 is reconfigured to enable the performance of the steps that will be described below with reference to FIGS. 7–9 to restructure data objects 24 on screen 22 of display 20. The user panel is created by using widgets provided by Motif, to locate the scroll bar and various variables corresponding to the size of data objects such as windows or view-ports are initialized as variables that are truncated or rounded off to integer value. Regarding size of windows and other data objects, including column data objects representing columns in a table, a useful convention is to measure the size in terms of display pixels. And usually pixels are grouped together to form a character, thus a pixel character position refers to a group of pixels of sufficient quantity to define the size of one character.

In response to a selection response by a user the "colPos [index]" is determined and the new variable is created. A binary signal is created in proportion to the value of "new" and may be stored as register values in memory 16. "New" is determined according to the rule described above and included in the pseudocode shown in Table 1. New is compared to the maximum_slider_size to prevent positioning the scroll bar past the maximum character position.

The scroll bar positioning module operates according to the logic embodied as the following pseudocode in Table 1:

```
XmScrollBarSetValues ( bottomSB, new,
    slider_size, increment, page_increment, True ) ;
XmScrollBarSetValues ( topSB, new,
    slider_size, increment, page_increment, True ) ;
```

Figure 7:
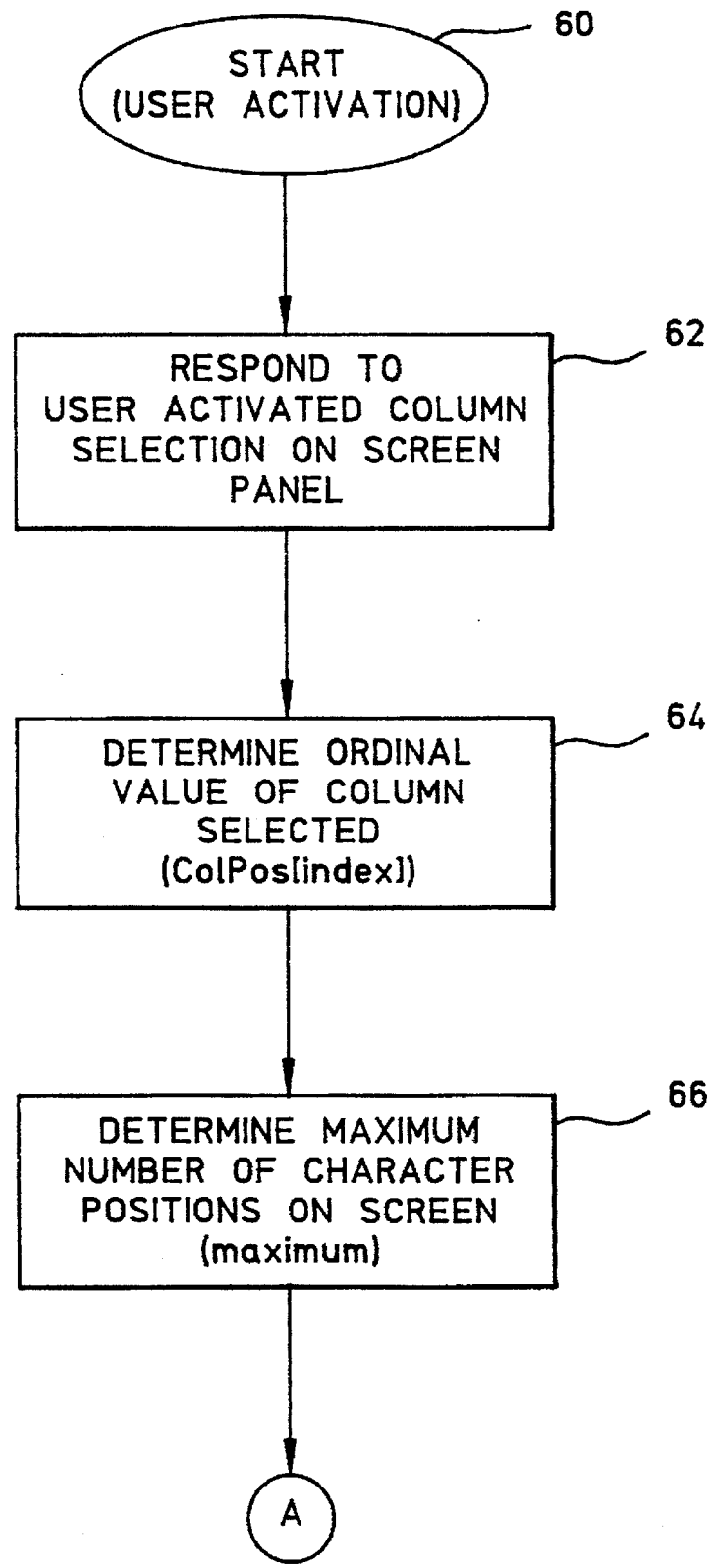
FIGS. 7, 8 and 9 are flow charts illustrating the operation of this invention.

In the above example, bottomSB refers to a widget class defining the scroll bar data object 52 shown in FIGS. 5–7, and topSB refers to a top scroll bar data object for the window containing data objects representing column headings. Preferably this top scroll bar is hidden from user view but is needed for synchronizing movements. The reason for hiding the top scroll bar is to avoid confusing the user by providing two scroll bars that each perform the same function.

Operation of the Invention

The following-described FIGS. 7, 8, 9 and 10 represent the operation of the logic modules 32–40 of the graphical user interface logic 26 within main memory 16. The operation of this invention is shown after user panel creation module 32 has acted to create panel 23 shown in FIGS. 5 and 6. Thus, the operation of the invention begins when the user activates the response module 34 by clicking on a button 50 in the bank of buttons 48. Thus, in step 60 the user activates operation of the invention. In step 62 the logic 26 responds to the user activated column selection on the screen panel. In step 64, the position determining module 36 is called by the logic to determine, among other things, the ordinal value of the column selected (colPos[index]) such as column position 9 for the exemplary "Age Factor" button. Next, in step 66, the position determining module determines the maximum number of character positions that may be shown on the screen ("maximum") by moving the scroll bar to show the last column data object. A good choice for maximum is 132, since many displays are adapted to show a maximum of 132 character positions. Thus, clicking on a button 50 moves the scroll bar anywhere from character pixel position 1 to character pixel position 132, in such an example case, without the need for the user manipulating the scroll bar. Connecting step "A" is used to show connection of the steps between FIGS. 7 and 8.

Figure 8:
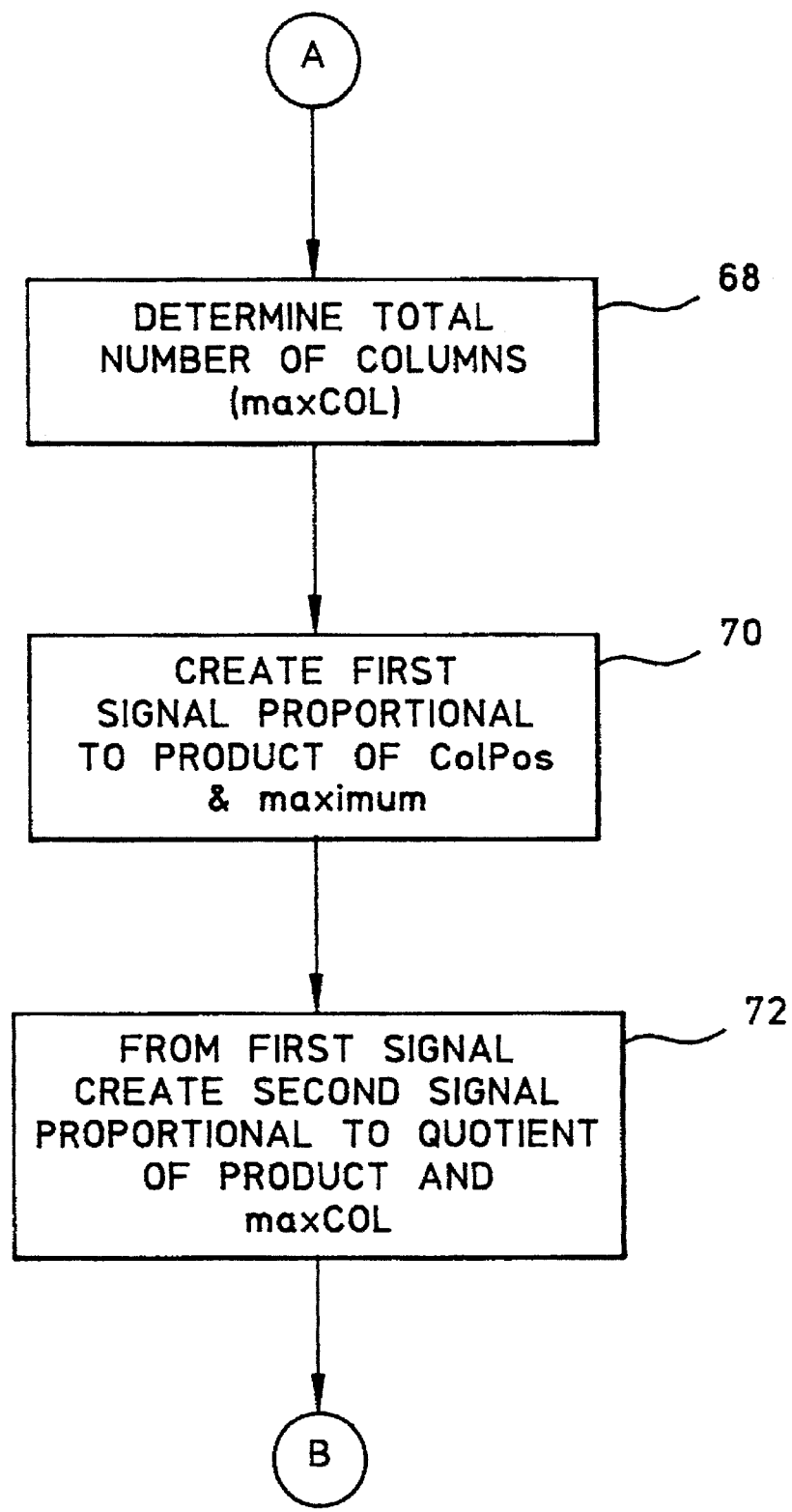

In FIG. 8, it is shown that step 68 acts to allow the position determining module to determine the total number of columns that can be presented in table 44. This variable ("maxCol") is "18" in the exemplary table shown in FIGS. 5 and 6. Next, signal creation module 38 creates a first and second signal, each proportional to values calculated by the graphical user interface logic 26. Thus, in step 70 a first signal which is proportional to the product of colPos[index] and maximum is calculated. In this example, the product equals 9×132 or 1,188. The signal may be represented in many forms including the changing of bits within a bit register or other binary representation within memory 16. It will be apparent to those skilled in the art that such a signal might also be represented in some other digital or analog fashion by hardware logic corresponding to the signal creation module shown in FIG. 4. In step 72, the signal creation module creates from the first signal a second signal which is proportional to the quotient of the product calculated in step 50 and the total number of columns (maxCol). Thus, the quotient would be 62.1 in this example. Because the variable "new" is identified in a preferred embodiment of the pseudocode shown in Table 1 as an integer, the 0.1 would be truncated and the quotient would be represented as 62. In the same fashion as the first signal, the second signal is preferably represented as bits within memory 16. Connecting step "B" is shown to indicate that the method steps flow from FIG. 8 to FIG. 9 described below.

Figure 9:
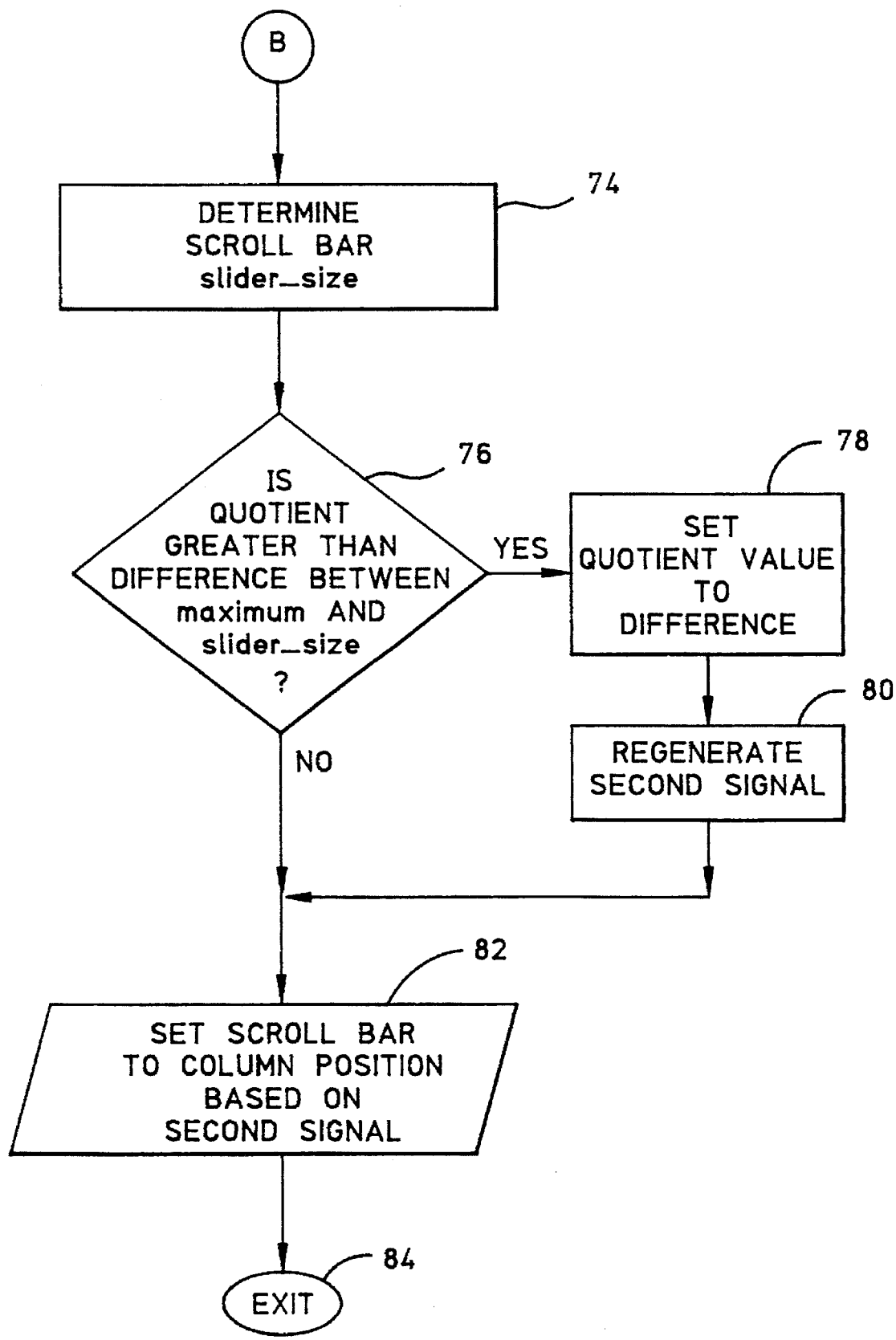
Figure 10:
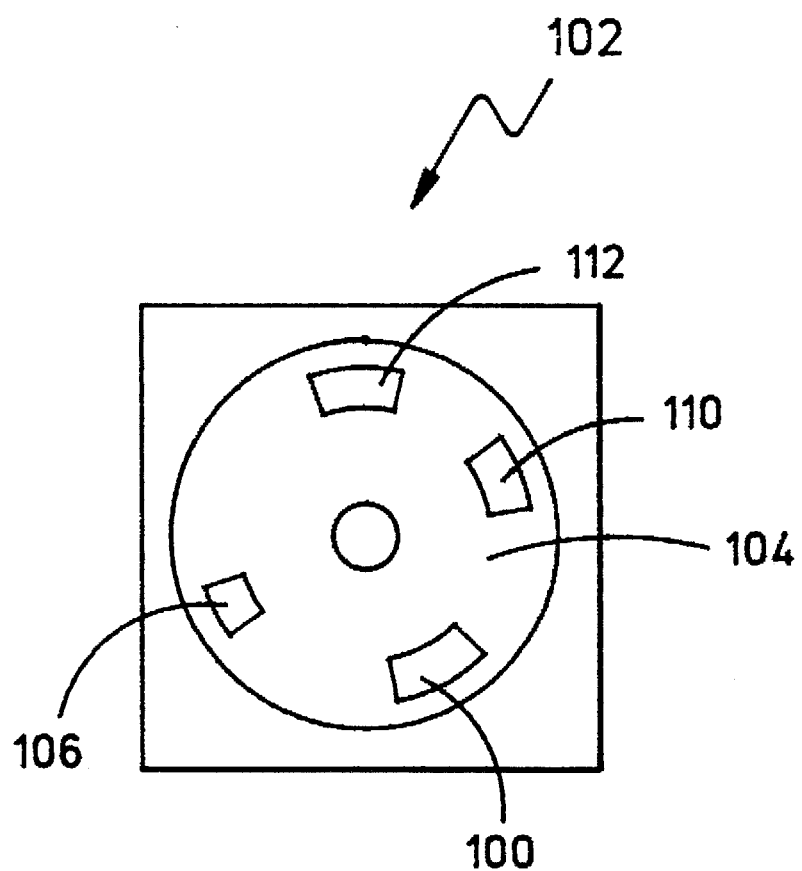
FIG. 10 is an article of manufacture or a computer program product including a storage medium for storing thereon program means for carrying out the method of this invention in the data processing system of FIG. 2.

In FIG. 9, step 74 is shown wherein the scroll bar positioning module 40 determines the scroll bar slider_size from the first and second signal created in steps 70 and 72. According to the preferred embodiment shown in Table 1, the position determining module determines whether the second value is greater than the difference between maximum and the slider_size, in step 76. The slider_size and maximum are preferably each measured in terms of pixel character positions. This is represented in the Table 1 as a line of "C" language code identified as "if(new >maximum-slider_size) and "new=maximum-slider_size". In accordance with this test, if the answer to the inquiry in step 76 is "yes" then the second value is set to the difference between the maximum and slider_size, and in step 80, the second signal is regenerated to correspond to this second value. If, however, the answer to the inquiry in step 76 is "no" then in step 82 the scroll bar is set to the column position based on the second signal without resetting the second value. In either case, the scroll bar is set to the column position based on the second signal in step 82 and the operation of the invention ends in step 84. Thus, the present invention enables scrolling across a table of multiple column entries wherein the user knows all the columns available in the table even though they may not be displayed in the panel and each one can be automatically selected and made visible to the user on an almost instantaneous basis.

While this invention is primarily discussed as a method, it can be understood by a person of ordinary skill in the art that the apparatus discussed above in connection with FIGS. 2 and 3 may be programmed or otherwise designed to facilitate the practice of the method of this invention. Also, an article of manufacture, such as a pre-recorded floppy disk 102 in FIG. 10 or other similar computer program product, for use with a data processing system, could include a storage medium, such as magnetic storage medium 104, and program means recorded thereon, such as program means 106, 100, 110 and 112, for directing the data processing system of FIG. 2 to facilitate the practice of the method of this invention. It will be understood that such apparatus and articles of manufacture also fall within the spirit and scope of this invention.

Other embodiments and modifications of this invention may occur to those of ordinary skill in the art in view of these teachings. Therefore, this invention is limited only by the following claims, which include all such embodiments and modifications when viewed in conjunction with the above specification and accompanying drawing.

What is claimed is:

1. In a computer system having a display with a screen and a graphical user interface, and further having memory coupled to the display, a method for displaying a specified column data object on the screen, wherein the column data object is part of a data table that includes a plurality of column data objects, the method comprising the unordered machine-executed steps of:

displaying an object metaphor on the screen that represents a column data object;

responsive to a user selecting the object metaphor on the screen, determining a particular column data object specified by the selection of the object metaphor;

storing an indexed location of the particular column data object relative to a value representing the total quantity of column data objects in the table;

determining and storing a first value representing the maximum allowable pixel character positions that the screen is adapted to display;

combining the indexed location with the first value to create a second value that is stored in memory;

creating a first signal proportional to the second value and having a second value component that represents the second value;

creating a second signal from the first signal by combining the second value component of the signal with the value representing the total quantity of column data objects in the table; and translating the second signal into a pixel character position and displaying that pixel character position on the screen, thereby displaying the specified column data object on the screen.

2. The method of claim 1, wherein the object metaphor is one of a plurality of object metaphors and each object metaphor represents one column data object of the plurality of column data objects belonging to the data table.

3. The method of claim 1, wherein the machine-executed step of combining the indexed location and the first value is performed by multiplying the indexed location by the first value, thereby creating a second value that is the multiplicative product of the indexed location and the first value.

4. The method of claim 3, wherein the combining of the second value with the value representing the total quantity of column data objects in the table is performed by dividing the value representing the total quantity of column data objects in the table by the second value component of the first signal.

5. The method of claim 2, wherein the graphical user interface includes a window in which the column data objects are displayed.

6. The method of claim 5, wherein the window includes a scroll bar that is substantially equivalent to the size of the window and the scroll bar includes a slider that may be moved by the user to cause different column data objects of the plurality of column data objects to be displayed in the window depending on the position of the slider.

7. The method of claim 6, wherein the machine-executed step of combining the indexed location and the first value is performed by multiplying the indexed location by the first value, thereby creating a second value that is the multiplicative product of the indexed location and the first value.

8. The method of claim 7, wherein the combining of the second value with the value representing the total quantity of column data objects in the table is performed by dividing the value representing the total quantity of column data objects in the table by the second value component of the first signal.

9. The method of claim 8, wherein the second signal is recreated if the difference between the first value and the size of the slider measured in pixel character positions is greater than the combination of the second value with the value representing the total quantity of column data objects in the table, wherein the combination is derived by dividing the value representing the total quantity of column data objects in the table by the second value component of the first signal.

10. A computer system comprising:

a processor;

memory coupled to the processor;

a display coupled to the memory, the display having a screen;

graphical interface logic being loaded into the memory for providing a graphical user interface on the display screen; and the graphical interface logic having machine-executed means coupled to the processor for displaying a user specified column data object on the screen, wherein the column data object is part of a data table that is comprised of a plurality of column data objects by:

displaying an object metaphor on the screen that represents a column data object;

responsive to a user selecting the object metaphor on the screen, determining a particular column data object specified by the selection of the object metaphor;

storing an indexed location of the particular column data object relative to the value representing the total quantity of column data objects in the table;

determining and storing a first value representing the maximum allowable pixel character positions that the screen is adapted to display;

combining the indexed location with the first value to create a second value that is stored in memory;

creating a first signal proportional to the second value and having a second value component that represents the second value;

creating a second signal from the first signal by combining the second value component of the signal with the value representing the total quantity of column data objects in the table; and translating the second signal into a pixel character position and displaying that pixel character position on the screen, thereby displaying the specified column data object on the screen.

11. The system of claim 10, wherein the object metaphor is one of a plurality of object metaphors and each object metaphor represents one column data object of the plurality of column data objects belonging to the data table.

12. The system of claim 10, wherein the machine-executed means includes means for combining the indexed location and the first value by multiplying the indexed location by the first value, thereby creating a second value that is the multiplicative product of the indexed location and the first value.

13. The system of claim 12, wherein the machine-executed means include means for combining of the second value with the value representing the total quantity of column data objects in the table is performed by dividing the value representing the total quantity of column data objects in the table by the second value component of the first signal.

14. The method of claim 11, wherein the graphical user interface includes a window in which the column data objects are displayed.

15. A computer program product for use in a computer system having a display with a screen and a graphical user interface, and further having memory coupled to the display, the program product being adapted for displaying a specified column data object on the screen, wherein the column data object is part of a data table that is comprised of a plurality of column data objects, the computer program product comprising:

a recording medium;

means, recorded on the recording medium, for displaying an object metaphor on the screen that represents a column data object;

means, recorded on the recording medium, for determining a particular column data object specified by the selection of the object metaphor in response to a user selecting the object metaphor on the screen;

means, recorded on the recording medium, for storing an indexed location of the particular column data object relative to the value representing the total quantity of column data objects in the table;

means, recorded on the recording medium, for determining and storing a first value representing the maximum allowable pixel character positions that the screen is adapted to display;

means, recorded on the recording medium, for combining the indexed location with the first value to create a second value that is stored in memory;

means, recorded on the recording medium, for creating a first signal proportional to the second value and having a second value component that represents the second value;

means, recorded on the recording medium, for creating a second signal from the first signal by combining the second value component of the signal with the value representing the total quantity of column data objects in the table; and means, recorded on the recording medium, for translating the second signal into a pixel character position and displaying that pixel character position on the screen, thereby displaying the specified column data object on the screen.

16. The computer program product of claim 15, the means for combining the indexed location and the first value includes means for performing the combining operation by multiplying the indexed location by the first value, thereby creating a second value that is the multiplicative product of the indexed location and the first value.

17. The computer program product of claim 16, wherein the means for combining of the second value with the value representing the total quantity of column data objects in the table further includes means for performing the combining by dividing the value representing the total quantity of column data objects in the table by the second value component of the first signal.

18. The computer program product of claim 15, wherein the graphical user interface includes a window in which the column data objects are displayed.

19. An apparatus for displaying a specified column data object on a display screen, wherein the column data object is part of a data table that includes a plurality of column data objects, the apparatus comprising:

a processor;

memory coupled to the processor;

a display coupled to the memory, the display having a screen;

graphical user interface logic being loaded into the memory for providing a graphical user interface on the display screen; and the graphical user interface logic further including:

a user panel creation module for creating a plurality of object metaphors that are displayed on the display screen, wherein each object metaphor represents one respective column data object of the plurality of column data objects belonging to the data table;

a user panel selection response module for responding to a user selection of an object metaphor of the plurality of object metaphors;

a position determining module for translating the selection of the object metaphor into an indexed location of a particular column data object specified by the user selected object metaphor, wherein the indexed location is relative to the value representing the total quantity of column data objects in the table;

a signal creation module for creating a first signal proportional to the indexed location times a first value representing a maximum allowable pixel character positions that the screen is adapted to display, the first signal having a first value component that represents the first value, and the signal creation module also being adapted to create from the first signal first value component a second signal that is proportional to the first value; and a positioning module for translating the second signal into a pixel character position and displaying that pixel character position on the screen, thereby displaying the specified column data object on the screen.

* * * * *